United States Patent
Geurtz et al.

(12) 
(10) Patent No.: US 9,254,586 B2
(45) Date of Patent: Feb. 9, 2016

(54) PROCESS FOR PRODUCING A FUEL TANK WITH UNDERRIDE PROTECTOR

(75) Inventors: Heinz-Jürgen Geurtz, Althengstett-Neuhengstett (DE); Ulrich Essig, Wendlingen (DE)

(73) Assignee: Dr. Ing. h.c. f. Porsche Aktiengesellschaft (DE)

( * ) Notice: Subject to any disclaimer, the term of this patent is extended or adjusted under 35 U.S.C. 154(b) by 994 days.

(21) Appl. No.: 12/435,435

(22) Filed: May 5, 2009

(65) Prior Publication Data

US 2009/0309348 A1 Dec. 17, 2009

(30) Foreign Application Priority Data

Jun. 11, 2008 (DE) .......................... 10 2008 027 864

(51) Int. Cl.
| | |
|---|---|
| *B29C 37/00* | (2006.01) |
| *B60K 15/03* | (2006.01) |
| *B29C 49/22* | (2006.01) |
| *B29C 49/02* | (2006.01) |
| *B29L 9/00* | (2006.01) |
| *B29L 31/00* | (2006.01) |

(52) U.S. Cl.
CPC ............. *B29C 37/0082* (2013.01); *B29C 49/22* (2013.01); *B60K 15/03* (2013.01); *B29C 37/0085* (2013.01); *B29C 49/02* (2013.01); *B29C 2049/021* (2013.01); *B29C 2049/222* (2013.01); *B29C 2049/227* (2013.01); *B29L 2009/001* (2013.01); *B29L 2031/7172* (2013.01)

(58) Field of Classification Search
CPC ...................... B29C 2049/227; B29C 37/0082; B29C 49/22; B29L 2009/001; B29L 2031/7172; B60K 15/03
USPC ............. 220/626, 62.11, 62.12, 62.13, 62.14, 220/62.15, 23.83, 23.86, 23.87, 23.88, 220/23.89, 562
See application file for complete search history.

(56) References Cited

U.S. PATENT DOCUMENTS

| | | | | | |
|---|---|---|---|---|---|
| 1,564,658 | A | * | 12/1925 | Xardell | 220/615 |
| 3,058,507 | A | * | 10/1962 | Patterson, Jr. | B25H 3/02 |
| | | | | | 220/626 |
| 3,924,773 | A | * | 12/1975 | Wilkinson | 220/88.3 |
| 4,342,799 | A | | 8/1982 | Schwochert | |
| 5,188,981 | A | | 2/1993 | Stiles et al. | |
| 5,553,734 | A | * | 9/1996 | Sharp | 220/567.1 |
| 5,839,599 | A | * | 11/1998 | Lin | G09F 23/06 |
| | | | | | 220/62.12 |
| 6,268,037 | B1 | | 7/2001 | Butler et al. | |
| 6,270,868 | B1 | * | 8/2001 | Matsui | 428/35.7 |
| 6,330,956 | B1 | * | 12/2001 | Willinger | 220/574 |
| 6,439,418 | B1 | * | 8/2002 | Immerman et al. | 220/630 |

(Continued)

FOREIGN PATENT DOCUMENTS

| | | |
|---|---|---|
| DE | 10005715 A1 | 9/2001 |
| DE | 10259468 | 7/2004 |

(Continued)

*Primary Examiner* — Robert J Hicks
*Assistant Examiner* — Kareen Thomas
(74) *Attorney, Agent, or Firm* — Gerald E. Hespos; Michael J. Porco; Matthew T. Hespos

(57) ABSTRACT

A fuel tank is produced together with an underride protector in a blow-molding tool by a blow-molding process. The underride protector is held on the fuel tank by a form-locking connection or by an integral connection. Therefore the outer underride protector is connected to the fuel tank in a simple production procedure.

2 Claims, 1 Drawing Sheet

(56) References Cited

U.S. PATENT DOCUMENTS

| | | | |
|---|---|---|---|
| 6,551,024 B1 * | 4/2003 | Berg et al. | 405/54 |
| 7,011,779 B2 * | 3/2006 | Fernandes | 264/138 |
| 7,694,841 B2 * | 4/2010 | Hattori et al. | 220/605 |
| 2002/0047015 A1 * | 4/2002 | Distelhoff et al. | 220/562 |
| 2003/0132647 A1 | 7/2003 | Cooper | |
| 2006/0124652 A1 * | 6/2006 | Ohtsuki et al. | 220/612 |
| 2006/0151505 A1 * | 7/2006 | Kobayashi | 220/562 |
| 2007/0163213 A1 | 7/2007 | Till | |
| 2008/0061066 A1 * | 3/2008 | Borchert et al. | 220/562 |
| 2010/0255234 A1 | 10/2010 | Koetke | |

FOREIGN PATENT DOCUMENTS

| | | |
|---|---|---|
| DE | 10259486 A1 | 7/2004 |
| DE | 102006002632 A1 | 7/2007 |
| DE | 102006055117 | 5/2008 |
| WO | 9944851 A1 | 9/1999 |

* cited by examiner

PROCESS FOR PRODUCING A FUEL TANK WITH UNDERRIDE PROTECTOR

CROSS-REFERENCE TO RELATED APPLICATION

This application claims the priority, under 35 U.S.C. §119, of German application DE 10 2008 027 864.5, filed Jun. 11, 2008; the prior application is herewith incorporated by reference in its entirety.

BACKGROUND OF THE INVENTION

Field of the Invention

The invention relates to a process for producing a fuel tank for a motor vehicle which has an underride protector on the outside and to a fuel tank with an underride protector.

Published, non-prosecuted German patent application DE 102 59 486 A1 discloses a fuel tank with a heat shielding device, which is placed with other elements in a molding tool for the fuel tank and connected to the latter during the molding process.

SUMMARY OF THE INVENTION

It is accordingly an object of the invention to provide a process for producing a fuel tank with an underride protector that overcomes the above-mentioned disadvantages of the prior art devices of this general type, in which the underride protector is temporarily connected to the fuel tank, at least until final assembly on the vehicle.

The advantages primarily achieved by the invention are that an outer underride protector can be connected to a fuel tank in a simple production procedure in which, according to a first process step, the starting material of the underride protector is placed together with the starting material of the fuel tank one on top of the other in a blow-molding tool. In a further process step, the starting material of the underride protector and the starting material of the fuel tank are deformed together by a blow-molding process in a blow-molding tool to form a fuel tank with an underride protector adapted to the outer form of the fuel tank. Wherein, in this process step, an integral connection or a form-locking connection is at the same time produced between the underride protector and the fuel tank in the blow-molding tool. This advantageously achieves the effect that, with the production of the fuel tank by the blow-molding process, at the same time the underride protector can be integrally or form-locking connected to the fuel tank.

During the blow-molding process, the connecting local integral bond is formed between the underride protector and the fuel tank in a number of contact zones by a residual process heat of the blow-molded body. This residual process heat of the blow-molded body is consequently used in an advantageous way to achieve an integral bond in contact zones between the fuel tank and the underride protector, which holds the two components against each other at least until final assembly.

According to a further refinement of the invention, it is provided that the starting material of the underride protector has at least one aperture, which is filled by the opposing starting material of the fuel tank during the blow-molding process and the holding-together form-locking connection is formed between the fuel tank and the surrounding underride protector. This achieves the effect that a connection between the fuel tank and the underride protector is produced by a positive engagement in a blow-molding operation, this connection being created while the tolerances in all the components are eliminated.

The underride protector and the fuel tank is formed of a plastic material. More specifically, the underride protector is formed for example of a plastic material such as preferably of the series of polypropylenes with a glass fiber component (PP-GF) and the fuel tank is formed of a plastic material of the series of polyethylenes (HD-PE).

The integral connection between the underride protector and the fuel tank by local contact can be produced by the blow-molding process or by some other procedure.

Similarly, the underride protector may have apertures which are arranged so as to correspond to projections of the fuel tank and a holding-together form-locking connection is formed between the fuel tank and the underride protector. It is also possible in the case of this configuration for the form-locking connection to be produced by some other procedure than the blow-molding process.

Other features which are considered as characteristic for the invention are set forth in the appended claims.

Although the invention is illustrated and described herein as embodied in a process for producing a fuel tank with an underride protector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
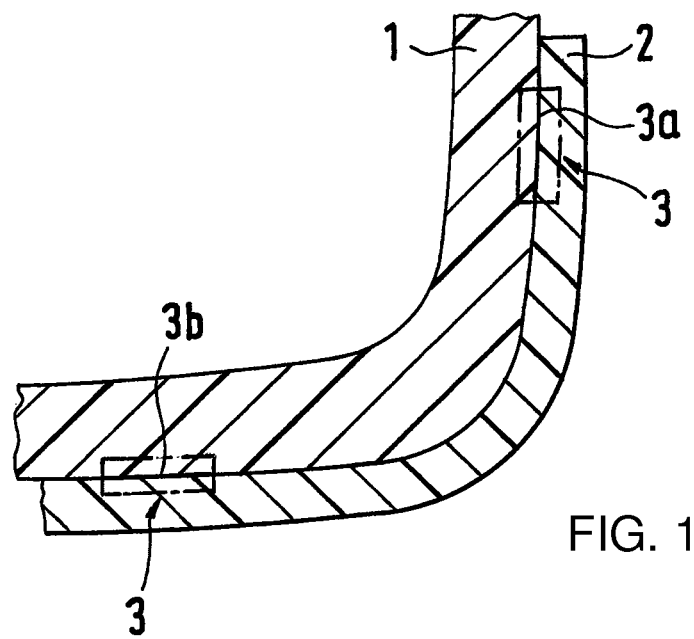
FIG. 1 is a diagrammatic, sectional view of a corner region of a fuel tank with an integrally connected underride protector according to the invention.
Figure 2:
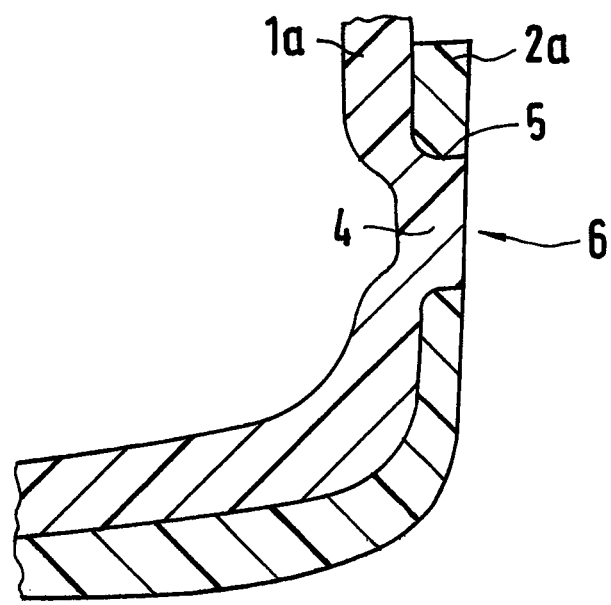
FIG. 2 is a diagrammatic, section view of the corner region of the fuel tank with a form-lockingly connected underride protector in section.

Referring now to the figures of the drawing in detail and first, particularly, to FIGS. 1 and 2 thereof, there is shown a fuel tank 1; 1a, formed of a plastic material, and produced together with an underride protector 2; 2a, formed of a plastic material, in a blow-molding tool by a blow-molding process.

For this purpose, in a first process step, a starting material of the underride protector 2; 2a is placed together with the starting material of the fuel tank 1; 1a one on top of the other in the blow-molding tool. After that, in a second process step, the blow-molding takes place, wherein the starting material of the underride protector 2; 2a and the starting material of the fuel tank 1; 1a are deformed together by the blow-molding process in the blow-molding tool to form the fuel tank 1; 1a with the underride protector 2; 2a adapted to an outer form of the fuel tank. In this process step, the underride protector 2; 2a is at the same time connected to the fuel tank 1; 1a in the blow-molding tool, in such a way that they are held together, by an integral or form-locking connection 3; 6. A form-locking connection is one that connects two elements together due to the shape of the elements themselves, as opposed to a force-locking connection, which locks the elements together by force external to the elements.

A local integral connection 3 between the fuel tank 1 and the underride protector 2 is achieved by using residual process heat of the blow-molded body in a number of contact zones 3a, 3b between the underride protector 2 and the fuel tank 1 to hold these components against each other. As shown in FIGS. 1 and 2, the fuel tank 1, 1a has opposite inner and outer surfaces. The underride protector 2, 2a has a convex outer surface and a concave inner surface nested in face-to-face relationship with areas of the outer surface of the fuel tank 1, 1a.

According to a further variant, the fuel tank 1a may be connected to the underride protector 2a by a form-locking connection 6. In this case, the starting material of the underride protector 2a has at least one aperture 5, for example a circular aperture, which is filled by the opposing starting material of the fuel tank 1a during the blow-molding process with a projection 4, and the form-locking connection 6 is consequently obtained between the fuel tank 1a and the underride protector 2a.

The underride protector 2; 2a may be formed, for example, of a plastic material such as preferably from the series of polypropylenes with a glass fiber component (PP-GF) and the fuel tank 1; 1a may be formed for example of a plastic material of the series of polyethylenes (HD-PE).

If a process other than the blow-molding process is used for producing the fuel tank 1; 1a and the underride protector 2; 2a, the fuel tank 1; 1a and the underride protector 2; 2a may be connected to each other by an integral connection 3 or a form-locking connection 6.

In this way, the integral connection 3 is achieved by heat supplied to the contact zones 3a, 3b, and the form-locking connection 6 is achieved by corresponding projections 4 on the outer wall of the fuel tank 1a, which engage in a clamping manner in apertures 5 or openings in the underride protector 2a.

The invention claimed is:

1. A fuel tank system for a motor vehicle, comprising:
a fuel tank formed of a plastic material, the fuel tank having a plurality of angularly aligned wall sections that are unitary with one another, each of the wall sections of the fuel tank having an inner surface facing into an interior of the fuel tank and an outer surface opposite the inner surface and defining a convex exterior of the fuel tank; and
an underride protector having a plurality of angularly aligned wall sections that are unitary with one another, the wall sections of the underride protector defining a concave inwardly facing surface of the underride protector and a convex outwardly facing surface opposite the concave inwardly facing surface and defining a convex exterior of the fuel tank system, the concave inwardly facing surface defined by the wall sections of the underride protector being in direct surface to surface contact with at least selected areas of the convex exterior of the fuel tank and being connected directly in surface to surface contact to the convex exterior of said fuel tank locally at a number of spaced apart points by integral bonds with at least one of the points being on each of the angularly aligned wall sections, wherein the underride protector is formed of a plastic material with a glass fiber component and wherein the integral connection between the concave inwardly facing surface of the underride protector and the convex exterior of the fuel tank being defined by a plurality of integral bonds between the plastic material of the fuel tank and the plastic material of the underride protector.

2. The fuel tank system of claim 1, wherein the plastic material of the underride protector is a polypropylene.

* * * * *